Oct. 25, 1966 T. H. BLADEN 3,281,703
HIGH INPUT IMPEDANCE COMPLEMENTARY SYMMETRY TRANSISTOR EMITTER-FOLLOWER
Filed May 28, 1964
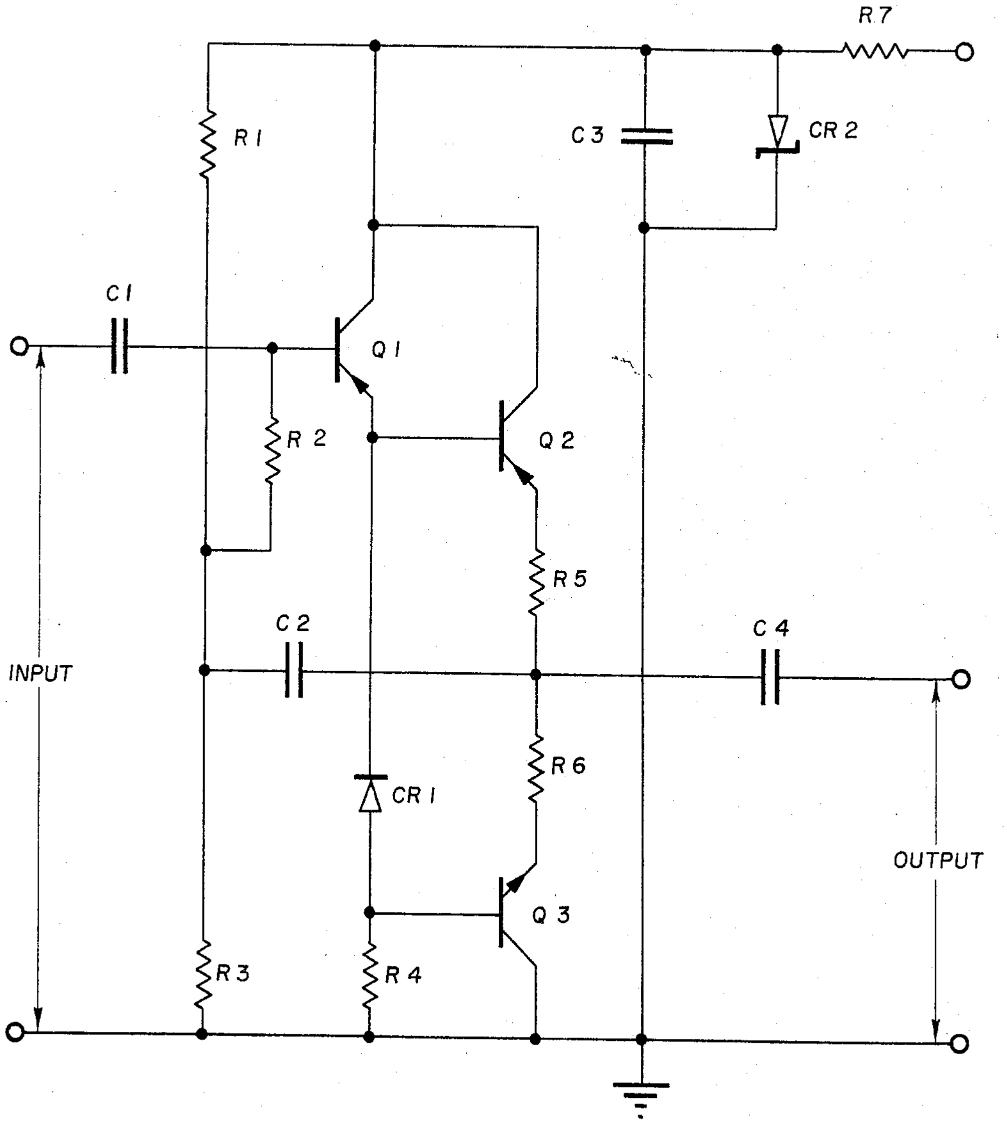
INVENTOR
Thomas H. Bladen
BY [signature]
ATTORNEY

United States Patent Office 3,281,703

Patented Oct. 25, 1966

3,281,703

HIGH INPUT IMPEDANCE COMPLEMENTARY SYMMETRY TRANSISTOR EMITTER-FOLLOWER

Thomas H. Bladen, Adelphi, Md., assignor to the United States of America as represented by the Secretary of the Navy Filed May 28, 1964, Ser. No. 371,146
1 Claim. (Cl. 330—13)

The invention described herein may be manufactured and used by or for the Government of the United States of America for governmental purposes without the payment of any royalties thereon or therefor.

The present invention relates generally to electronic high impedance to low impedance coupling circuits. More particularly, the invention is directed to a novel amplifier circuit capable of coupling a bandpass filter or other similar low impedance circuit to a high impedance signal source.

In order to accurately measure R.M.S. signal levels of various circuits within a signal simulator circuit or the like over a specified frequency bandwidth, the A.C. voltmeter used must be preceded by a bandpass filter having the desired bandwidth. The loading effect of the low input impedance bandpass filter characteristic on the high impedance source results in inaccurate measurements during monitoring of the high impedance signal circuits within the signal simulator.

The present invention permits monitoring of these high impedance signal circuits without the aforedescribed disadvantages.

An object of the present invention is to provide a new and improved high impedance to low impedance coupling circuit.

Another object is to provide a novel complementary symmetry emitter-follower circuit which is preceded by a high input impedance amplifier, said circuit being adapted to drive a bandpass filter or low impedance circuits to relatively high positive or negative undistorted signal levels.

A further object of the invention is to provide a novel coupling circuit which will enable a bandpass filter to be connected to a high impedance signal source with negligible loading effects on the bandpass filter.

Still a further object is to provide a high impedance to low impedance coupling circuit especially adapted to couple a low impedance bandpass filter to a high impedance source while providing a constant bandpass filter output voltage over a specified frequency bandwidth.

Other objects and attendant advantages of the present invention will become more fully apparent in the following description of the sole illustrated embodiment thereof.

The specific nature of the invention, as well as other objects, aspects, uses and advantages thereof, will clearly appear from the following description and from the accompanying drawing in which the sole figure is a schematic circuit diagram of a preferred embodiment of the invention.

The following is a table illustrating the values and ratings for the various circuit elements used in constructing the particular embodiment of the coupling circuit shown in the drawing.

*Table of circuit parameters*

| | |
|---|---|
| $Q_1$ | 2N1307. |
| $Q_2$ | 2N1309. |
| $Q_3$ | 2N1308. |
| $R_1$ | 43KΩ. |
| $R_2$ | 100KΩ. |
| $R_3$ | 56KΩ. |
| $R_4$ | 12KΩ. |
| $R_5$ | 5 ohms. |
| $R_6$ | 5 ohms. |
| $R_7$ | 510 ohms. |
| $C_1$ | 0.5 $\mu$f., 100v. |
| $C_2$ | 68 $\mu$f., 15v. |
| $C_3$ | 100 $\mu$f., 20v. |
| $C_4$ | 100 $\mu$f., 20v. |
| CR1 | 1N276. |
| CR2 | 1N967A, 18v. |
| Zin | approx. 750KΩ. |
| Zout | approx. 100Ω. |
| Maximum signal output (push-pull) | approx. 15v. |
| Maximum operating temperature | 140° F. |
| Maximum signal current (Imax) | 8.6 ma. |
| Quiescent signal current | 1.8 ma. |

PNP transistor $Q_1$ which is connected as an emitter-follower with resistor $R_4$ and rectifier CR1 in the emitter circuit thereof forms the input stage of the coupling circuit of the present invention. To the output of the emitter-follower stage is direct coupled a complementary symmetry pair of transistors $Q_2$ and $Q_3$. A pair of identical resistors $R_5$ and $R_6$ interconnect the emitters of transistors $Q_2$ and $Q_3$ to provide a balanced output of positive and negative signals taken from the junction point of these two resistors. The collector electrodes of transistors $Q_1$ and $Q_2$ respectively are connected to a Zener diode regulated −18 volt source, input or and the input or collector electrode of $Q_3$ is connected to ground.

A bias voltage divider network including $R_1$ and $R_3$ is connected across the −18 volt source. Resistor $R_2$ is connected to the junction of resistors $R_1$ and $R_3$ and the base electrode of $Q_1$ for applying the desired negative potential thereto. The voltage divider network serves to decrease the input impedance of the emitter-follower stage but the capacitor $C_2$ coupled between the midpoint of resistors $R_5$ and $R_6$ and the base electrode of transistor $Q_1$ provides a positive feedback path which serves to cancel the parallel resistance of the bias voltage divider. This positive feedback signal via $C_2$ tends to increase the input impedance of the emitter-follower stage in a manner similar to a boot-strapped cascaded emitter-follower circuit.

Transistors $Q_2$ and $Q_3$ conduct in an alternate manner to provide a low impedance output for positive and negative signals. PNP transistor $Q_2$ conducts with negative signals applied to the base electrode thereof and NPN transistor $Q_3$ conducts with positive signals applied to its base electrode.

The germanium diode CR1 is connected between the base electrode of transistor $Q_3$ and the emitter electrode of $Q_1$ and provides compensation for the collector-base leakage current increases of transistors $Q_2$ and $Q_3$ with increasing temperatures.

Bias for class B operation of $Q_2$ and $Q_3$ is determined by diode CR1 and resistors $R_5$ and $R_6$ which provide low cross-over distortion and minimum quiescent collector current during the alternate conduction of transistors $Q_2$ and $Q_3$. Resistors $R_5$ and $R_6$ also serve to compensate for temperature variations and to prevent thermal run-away with the emitter-follower amplifier $Q_1$ operating at high signal output levels.

Zener diode CR2 operates as a —18 v. regulator when the amplifier is powered from a —24 v. power source. Capacitor $C_3$ rated at 20 volts is connected in parallel with CR2 and further serves to prevent instantaneous changes in the supply voltage applied to the collector electrodes of $Q_1$ and $Q_2$.

The maximum power output of the complementary symmetry circuit is determined primarily by the power dissipation ratings of $Q_2$ and $Q_3$. High and low frequency response characteristics of the circuit are principally determined by the transistor $f_{ab}$ parameters and the coupling capacitor values of $C_1$ and $C_4$ respectively.

What has been described above is only intended as an exemplary embodiment of the present invention. Obviously many modifications and changes may be made in the circuit shown and in the parameter values listed above without departing from the spirit and scope of the present invention.

What is claimed is:

A circuit for coupling signals from a high impedance source to a network having a low input impedance, comprising:

(a) a pair of terminals to which a source of D.C. supply voltage may be connected, (b) a first transistor having a base electrode, a collector electrode, and an emitter electrode, and connected across said pair of terminals as an emitter-follower circuit, (c) an input terminal to which said signals from a high impedance source may be applied, (d) first coupling means for connecting said input terminal to said base electrode of said first transistor, (e) a bias voltage divider network connected across said pair of terminals and to said base electrode of said first transistor, (f) a complementary symmetry pair of transistors each having a base electrode, a collector electrode, and an emitter electrode and connected as a push-pull amplifier, each of said pair of transistors having their respective collector electrodes connected to a respective one of said pair of terminals and said base electrode of one of said pair of transistors directly connected to the emitter electrode of said first transistor, (g) a crystal diode connected between said emitter electrode of said first transistor and said base electrode of the other of said pair of transistors, said diode providing compensation for the collector base leakage current increases of said pair of transistors with increasing temperature, (h) a pair of identical resistors connected in series between the emitter electrodes of said pair of transistors, said pair of identical resistors and said crystal diode determining the bias for class B operation of said pair of transistors and providing low cross-over distortion and minimum quiescent collector current during the alternate conduction of said pair of transistors, said pair of identical resistors further providing compensation for temperature variations and preventing thermal run-away with said first transistor operating at high signal levels, (i) a positive feedback loop including a capacitor connected between the junction of said pair of identical resistors and said base electrode of said first transistor which serves to cancel the parallel resistance of said bias voltage divider network and thereby increase the input impedance of the circuit, (j) an output terminal to which said network having a low input impedance may be connected, and (k) second coupling means for connecting said output terminal to the junction of said pair of identical resistors.

References Cited by the Examiner

UNITED STATES PATENTS

| | | | |
|---|---|---|---|
| 2,878,380 | 3/1959 | Holmes | 330—13 X |
| 2,964,673 | 12/1960 | Stanley | 330—17 X |
| 3,154,639 | 10/1964 | Rakha et al. | 330—13 X |
| 3,221,262 | 11/1965 | Houpt | 330—24 X |

FOREIGN PATENTS

| | | |
|---|---|---|
| 1,170,455 | 5/1964 | Germany. |

OTHER REFERENCES

Sziklai: Transistor Circuits and Applications, Electronic Engineering, September 1953, pages 358–364.

ROY LAKE, *Primary Examiner.*

F. D. PARIS, *Assistant Examiner.*